United States Patent
Appenzeller et al.

(10) Patent No.: US 6,796,264 B1
(45) Date of Patent: Sep. 28, 2004

(54) FLUID FLOW MONITOR AND INDICATOR

(75) Inventors: Robert C. Appenzeller, Dayton, OH (US); Curtis R. Bailey, Troy, OH (US)

(73) Assignee: Machine Products Corporation, Dayton, OH (US)

( * ) Notice: Subject to any disclaimer, the term of this patent is extended or adjusted under 35 U.S.C. 154(b) by 0 days.

(21) Appl. No.: 10/446,389

(22) Filed: May 28, 2003

(51) Int. Cl.[7] .............................................. G08B 21/00
(52) U.S. Cl. .................. 116/112; 116/264; 116/DIG. 7; 340/619
(58) Field of Search ................................ 116/112, 202, 116/264, 273, 274, 276, DIG. 7; 340/614, 619, 603, 606; 137/551; 73/861, 861.7, 861.55, 861.56, 861.57, 305, 314, 322.5, 323

(56) References Cited

U.S. PATENT DOCUMENTS

| | | | |
|---|---|---|---|
| 2,847,969 A | | 7/1956 | Woodruff |
| 2,836,142 A | * | 5/1958 | Ainsworth .................. 116/274 |
| 3,007,436 A | * | 11/1961 | Thomas et al. ............. 116/276 |
| 3,330,248 A | * | 7/1967 | Cornell ....................... 116/268 |
| 3,570,447 A | * | 3/1971 | Basseches et al. .......... 116/112 |
| 3,713,338 A | * | 1/1973 | Kind ............................ 73/293 |
| 4,263,812 A | * | 4/1981 | Zeigner et al. .......... 73/861.05 |
| 4,343,191 A | * | 8/1982 | Cairenius ................. 73/861.05 |
| 4,398,428 A | * | 8/1983 | Kato ........................ 73/861.05 |
| 4,758,827 A | * | 7/1988 | Powers ..................... 340/691.7 |
| 4,819,577 A | * | 4/1989 | Campau ...................... 116/264 |
| 4,866,850 A | * | 9/1989 | Kelly et al. .............. 33/366.22 |
| 5,012,840 A | | 5/1991 | Betzler |
| 5,361,830 A | * | 11/1994 | Wicks et al. .................. 166/51 |
| 5,577,538 A | * | 11/1996 | Sunderhaus et al. .......... 141/94 |

FOREIGN PATENT DOCUMENTS

| | | | | |
|---|---|---|---|---|
| GB | 678762 | | 9/1952 | |
| JP | 58033120 A | * | 2/1983 | ............. G01F/1/05 |

\* cited by examiner

*Primary Examiner*—Diego Gutierrez
*Assistant Examiner*—Amy R Cohen
(74) *Attorney, Agent, or Firm*—Jacox, Meckstroth & Jenkins

(57) ABSTRACT

A metal body has a threaded inlet port and a threaded outlet port which extend to corresponding inlet and outlet chambers within the body, and a semi-spherical liner seats within the body and has ports communicating with the inlet and outlet chambers. A dome-shaped lens is sealed to the body and cooperates with the liner to define a fluid circulating chamber enclosing a fluid sensing ball having crossing holes therein. A mounting plate has a first opening receiving the body and a second opening receiving a power operated optical sensor having fiber optic cables positioned to sense through the lens movement of the ball within the fluid circulating chamber. The ball is sensitive to a very low flow rate and provides a visual indicator of the flow, and the optical sensor provides an electrical signal for operating an alarm or apparatus such as a machine which requires the fluid flow.

5 Claims, 2 Drawing Sheets

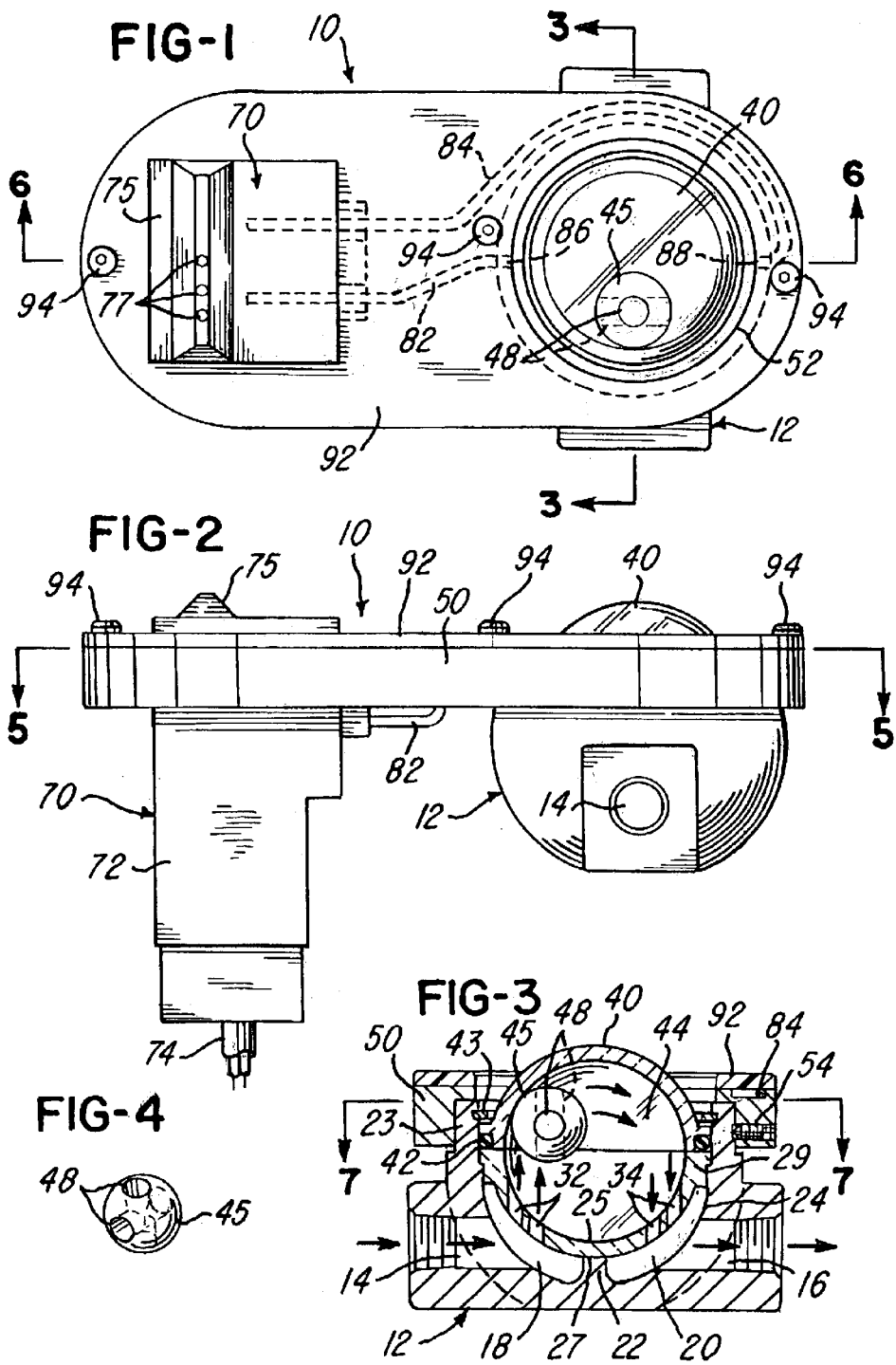

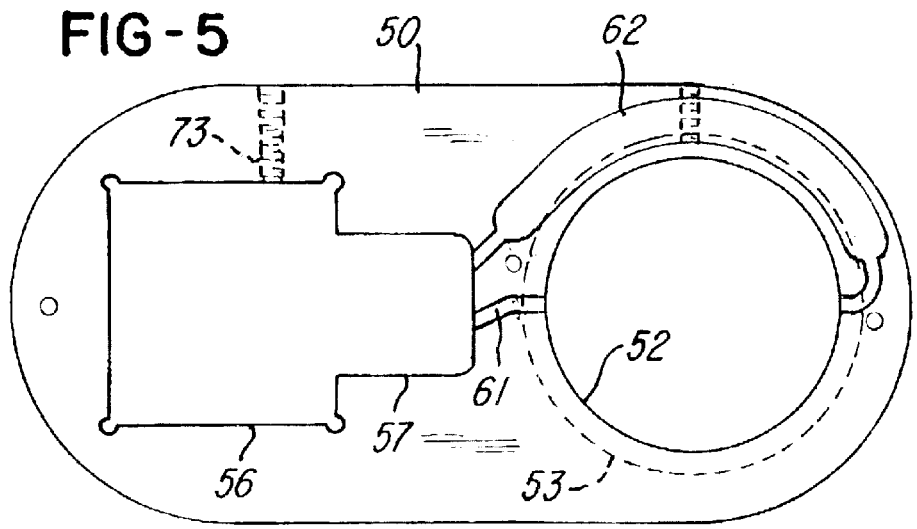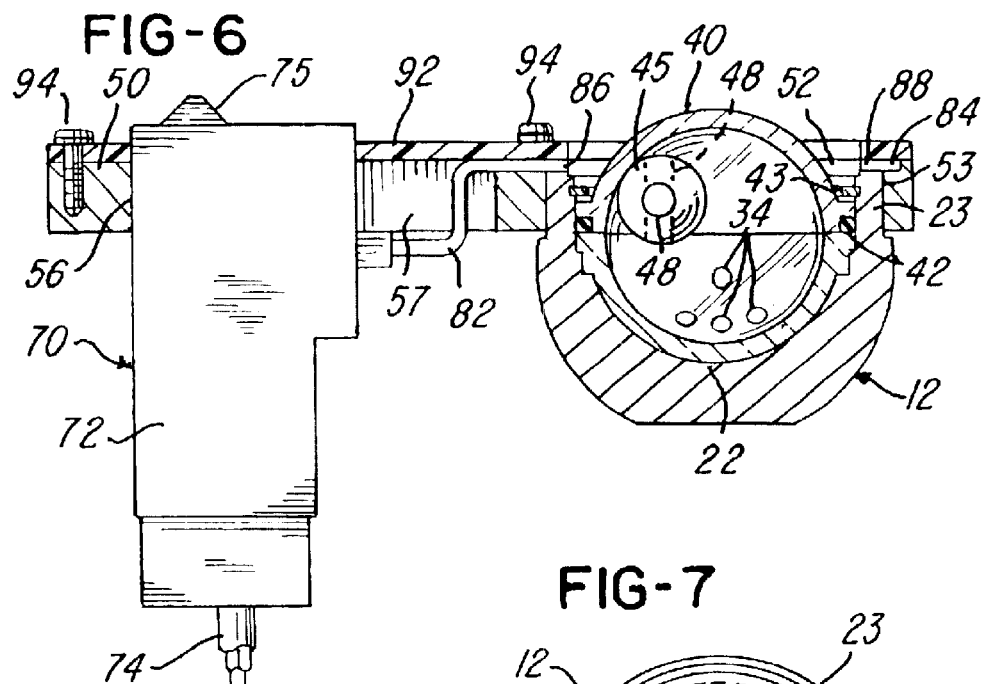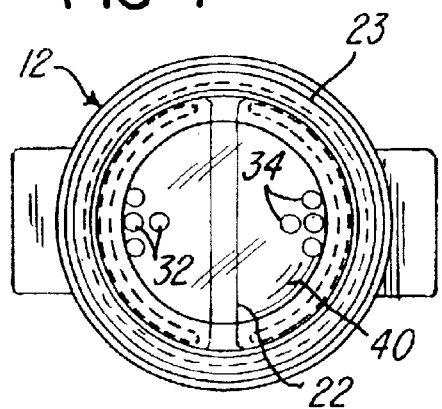

FLUID FLOW MONITOR AND INDICATOR

BACKGROUND OF THE INVENTION

This invention relates to fluid flow indicators of the general type disclosed, for example, in U.S. Pat. Nos. 2,847,969 and 5,012,840 and in British Patent No. 678,762. In such an indicator, it is sometimes desirable to provide for a visual indication of a very low fluid or liquid flow rate, for example, 0.2 gallons per minute (GPM). It is also sometimes desirable to provide for an electrical or electronic indication of the fluid flow in order to operate an electrical alarm or a power operated apparatus such as, for example, a machine which requires a flow of cooling liquid or water as in a welding machine or a die cast machine or an injection molding machine. In such a machine, if the cooling water stops flowing for some reason, it is highly desirable to actuate an electrical alarm or immediately stop the machine. While some compact fluid flow indicators provide a visual indication of fluid flow, they are not sensitive to very low flow rates and/or do not provide an electrical signal if fluid flow stops.

SUMMARY OF THE INVENTION

The present invention is directed to and improved and compact fluid flow monitor and indicator which provides for both a visual indication and an electronic indication of fluid flow and which is also simple in construction and may be easily installed on a control panel. The indicator of the invention is also sensitive to low flow rates, such as 0.2 GPM, and may be adapted for substantially higher flow rates such as 18 GPM. The flow indicator of the invention further provides for a long maintenance-free service life and results in no significant fluid pressure drop across the indicator.

A fluid flow monitor and indicator constructed in accordance with a preferred embodiment of the invention, includes a metal or brass body having a threaded inlet port and a threaded outlet port which extend to corresponding inlet and outlet chambers within the body. A semi-spherical plastic liner is recessed within the body and has small parallel ports extending from the inlet chamber and from the outlet chamber. A dome-shaped transparent lens is sealed to the body and cooperates with the liner to define a generally spherical fluid circulating chamber in which is located a small fluid sensing element in the form of a ball having crossing holes therein. The metal body is secured to and supported by a mounting base or plate which also supports a power operated optical sensor having fiber optic cables extending to opposite sides of the lens in order to sense movement of the ball within the fluid circulating chamber. The optical sensor provides an electrical signal for operating an alarm or for automatically controlling a machine which requires a fluid flow.

Other features and advantages of the invention will be apparent from the following description, the accompanying drawings and the appended claims.

BRIEF DESCRIPTION OF THE DRAWINGS

FIG. 1 is a front elevational view of a fluid flow monitor and indicator constructed in accordance with the invention and with dotted lines to show the paths of fiber optic cables;

FIG. 2 is a bottom view of the indicator shown in FIG. 1;

FIG. 3 is a fragmentary section taken generally on the line 3—3 of FIG. 1;

FIG. 4 is a perspective view of a fluid sensing ball constructed in accordance with the invention and used in the indicator shown in FIG. 1;

FIG. 5 is a plan view of only the mounting base or plate, taken generally on the line 5—5 of FIG. 2;

FIG. 6 is a section taken generally on the line 66 of FIG. 1; and

FIG. 7 is a view of the indicator body, liner and lens assembly, taken generally on the line 7—7 of FIG. 3.

DESCRIPTION OF THE PREFERRED EMBODIMENT

FIGS. 1 & 2 illustrate a fluid flow monitor and indicator unit 10 which includes a plastic or metal body 12 having an internally threaded inlet port 14 and an internally threaded outlet port 16. The ports extend into the body 12 to corresponding inlet and outlet chambers 18 and 20 separated by a transverse rib or body wall 22. The body 12 has an annular front portion 23 and defines a cup-shaped cavity 24 which receives a semi-spherical liner 25 preferably molded of a rigid plastics or polycarbonate material. The liner 25 seats on a semi-circular inner surface 27 of the transverse body wall 22 and has an upper flange portion 29 which seats within a counterbore within the annular body portion 23. The liner 25 cooperates with the body 12 to define the inlet chamber 18 and the separate outlet chamber 20.

The liner 25 has a set of four holes or ports 32 (FIGS. 3 & 6) which extend from the inlet chamber 18 and a set of four holes or ports 34 which extend from the outlet chamber 20. The annular portion 23 of the body 12 receives an annular end portion of a semi-spherical or dome-shaped lens 40 which is preferably formed of a light transparent plastics material such as polycarbonate. A resilient O-ring 42 forms a fluid-tight seal between the lens 40 and the liner 25 and also between these parts and the body portion 23, and a retaining ring 43 secures the lens 40 in place. The semi-spherical liner 25 and lens 40 cooperate to define a fluid circulating chamber 44 which receives fluid through the ports 32, and the fluid exits the chamber through the ports 34.

A fluid sensing element 45, preferably in the form of a sphere or ball molded of a light weight rigid plastics material such as acrylic, moves freely within the chamber 44 in response to the flow of fluid through the chamber. Preferably, the ball 45 has a pair of radially extending and crossing holes 48 (FIG. 4) which provide the ball 45 with high sensitivity to a very low fluid flow, for example, 0.2 GPM. The movement or agitation of the ball 45 is clearly apparent through the lens 40 and provides a visual indication when fluid is flowing through the chamber 44.

An elongated mounting base or plate 50 (FIG. 5) is preferably molded of a rigid plastics material and has a circular opening 52 and a counterbore 53 which receives the annular portion 23 of the body 12 (FIG. 3) and is secured to the annular portion by a set screw 54. The mounting plate 50 also has a square opening 56 (FIG. 5) having an extension 57, and the upper surface of the mounting plate 50 has a set of cavities or recesses 61 and 62. The recess 61 extends directly from the opening 57 to the opening 52, and the recess 62 extends from the opening 57 around the opening 52 to a point diametrically opposed to the recess 61. The back of the plate 50 is adapted to be mounted on a control or support panel (not shown) which has an opening slightly smaller than the plate 50.

A fiber optic sensor unit 70 has a square plastic housing 72 which mounts within the opening 56 of the mounting plate 50 and is secured by a set screw 73. The sensor 70 receives electrical power through a power supply line 74. One form of fiber optic sensor unit 70 which has provided desirable results is produced by Allen Bradley and identified as the Model No. 42GTF-9102. As shown in FIGS. 1 and 2, the fiber optic sensor 70 has an elongated pyramid-like projection or lens 75 supporting three light emitting diodes (LEDs) 77, one of which emits a red light, another a green light and another a yellow light.

A set of fiber optic cables 82 and 84 extend from the sensor 70 within the corresponding cavities or recesses 61 and 62, and the cables have outer ends 86 and 88 (FIG. 6) positioned in opposing relation on opposite sides of the transparent lens 40. A narrow light beam is emitted from the end 86 and is received by the end 88 of the fiber optic cables so that when the ball 45 is bouncing or moving within the chamber 44, the light beam is broken, and the interruption is detected by the sensor 70 which produces an electrical signal. As long as the ball 45 is being agitated and the light beam is being interrupted, the sensor 70 produces a green light from one of the LEDs 77. If for some reason the fluid flow through the chamber 44 stops, the ball 45 returns to its bottom rest position (FIG. 1), and the light beam through the fiber optic cables 82 and 84 becomes continuous causing the sensor 72 to generate a red light from one of the LEDs 77 and also generate an electrical signal which is used to acuate an audible alarm or stop a machine which requires a continuous flow of fluid through the indicator 10.

As shown in FIGS. 1, 2 and 6, the base member or mounting plate 50 is covered by an elongated and mating cover plate 92 which is preferably molded of a rigid plastic material. The cover plate 92 confines the fiber optic cables 82 and 84 within the cavities 61 and 62 and has openings for receiving the dome-shaped lens 40 and the optical sensor 70. The cover plate is secured to the mounting plate by a set of screws 94, as shown in FIGS. 1 and 6.

From the drawings in the above description, it is apparent that a fluid flow monitor and indicator constructed in accordance with invention, provides desirable features and advantages. For example, the indicator unit 10 provides for both a visual indication of the fluid or liquid flowing through the body 12 and the chamber 44 and also provides for an electrical or electronic indication of the fluid flow by means of the fiber optic sensor 70. The indicator unit 10 is also compact, simple and relatively inexpensive in construction and produces no significant fluid pressure drop through the body 12. The indicator unit 10 may also be used with very low flow rates, for example, as low as 0.2 GPM. That is, the fluid indicating element or ball 45 includes the crossing holes 48 which prevent laminar flow around the ball and make the ball sensitive to a low liquid flow rate within the chamber 44. The agitation or movement of the ball 45 is clearly visible through the transparent lens 40, and the ball continuously interrupts the narrow light beam extending between the optical cables 82 and 84 and through the lens 40 to actuate or control the optical sensor 70. When used for sensing higher flow rates, for example, 18 GPM, the separating rib or wall 22 (FIG. 3) is provided with a cavity or opening so that a portion of the fluid flowing into the inlet chamber 18 flows directly to the outlet chamber 20 and not through the ports 32 and 34.

While the form of fluid flow indicator herein described constitutes a preferred embodiment of the invention, it is to be understood that the invention is not limited to this precise form of indicator, and that changes may be made therein without departing from the scope and spirit of the invention as defined in the appended claims.

What is claimed is:

1. A fluid flow monitor and indicator unit, comprising body having a fluid inlet and outlet adapted to receive a flow of liquid, a transparent dome-shaped lens mounted on said body, a cup-shaped liner mounted within said body and cooperating with said dome-shaped lens to define a fluid circulating chamber, said body including a wall cooperating with said liner to define inlet and outlet chambers on opposite sides of said wall with said inlet and outlet chambers connected to the corresponding said inlet and outlet, said liner having ports connecting said chamber with said inlet and outlet chambers, a fluid sensing ball within said chamber and adapted to move in response to a fluid flowing through said chamber to provide a visual indication through said lens of the fluid flowing through said chamber, and said fluid sensing ball having at least one hole therein.

2. A unit as defined in claim 1 and including a power operated optical sensor including fiber optic elements positioned to detect through said lens movement of said fluid sensing ball within said chamber and to provide an electrical control in response to said movement of said ball.

3. A unit as defined in claim 2 and including an elongated mounting plate having a first opening receiving said body and secured to said body, said mounting plate having a second opening receiving said optical sensor and recesses receiving said fiber optical elements, and said mounting plate is secured to said sensor.

4. A unit as defined in claim 3 and including a cover plate overlying said mounting plate and confining said fiber optic elements within said recesses.

5. A unit as defined in claim 1 wherein said ball defines crossing interconnected holes extending through said ball and effective to produce substantial movement of said ball in response to a low fluid flow through said chamber.

* * * * *